United States Patent [19]

Noakes et al.

[11] 3,966,646

[45] June 29, 1976

[54] FABRICATING BODIES

[75] Inventors: Michael Lesney Noakes, Reading; Wilfred George Caesar, Pangbourne, Nr. Reading; William Henry Holland, Wallingford; Norman Herbert Hancock, Wantage, all of England

[73] Assignee: United Kingdom Atomic Energy Authority, London, England

[22] Filed: Oct. 29, 1974

[21] Appl. No.: 519,016

[30] Foreign Application Priority Data
Nov. 8, 1973  United Kingdom............... 51974/73

[52] U.S. Cl............................. 252/477 R; 72/147; 264/287; 55/520
[51] Int. Cl.²................... B01J 35/02; B21D 11/06
[58] Field of Search............ 72/146, 147, 196, 379; 113/118 R, 118 A, 118 D; 29/157.3 D, 455; 156/205, 207; 264/286, 287; 93/1 H, 84 R; 55/520, 521; 252/477 R

[56] References Cited
UNITED STATES PATENTS

| 574,157 | 12/1896 | Ljungstrom | 113/118 |
|---|---|---|---|
| 1,090,593 | 3/1914 | Bolger | 156/207 |
| 1,639,133 | 8/1927 | Greene | 55/520 |
| 2,373,218 | 4/1945 | Arnold | 29/157.3 |
| 2,696,976 | 12/1954 | Boestad et al. | 113/118 |
| 2,757,628 | 8/1956 | Johnston | 113/118 |
| 2,784,802 | 3/1957 | Bub et al. | 55/521 |
| 3,112,184 | 11/1963 | Hollenbach | 264/286 |
| 3,432,859 | 3/1969 | Jordan, et al. | 156/205 |

*Primary Examiner*—Lowell A. Larson
*Attorney, Agent, or Firm*—Larson, Taylor and Hinds

[57] ABSTRACT

A method of manufacturing a body comprising the steps of forming a single strip of material with at least one plain region and at least one region of protrusions, such as corrugations, bumps or ridges. The single strip of material is then laid on itself in a manner so as to provide two or more layers of the material and locate a plain region of one layer alongside a region of protrusions of an adjacent layer. The laying step may be accomplished by winding the strip into a coil.

28 Claims, 8 Drawing Figures

FABRICATING BODIES

This invention relates to methods of fabricating bodies which are constructed to have channels extending through them.

One way of fabricating such bodies is to lay together two or more corrugated sheets which have identical parallel corrugations in such a way that adjacent sheets touch along their crests. It is customary to join the sheets together along the crests of the corrugations. It is, however, very difficult to position each sheet accurately relative to the other when producing such bodies on a production-line. It is particularly difficult to avoid nesting of crests of one sheet in to the valleys of an adjacent sheet. This problem is even greater in those cases where it is not possible to join the sheets together, but it is desired to maintain the sheets in contact with each other. Similarly, if a single corrugated sheet is wound upon itself to form a coil, it is difficult to prevent the crests of one layer nesting in the valleys of the next inner layer.

One way of lessening these problems has been to bond a separate plain sheet to the corrugated sheet. In this way, the plain sheet serves as a dividing wall which prevents the crest of the corrugations of each layer nesting in to the valleys of adjacent layers when the sheets are laid up. Here again, during production it is necessary to have two sources of sheets, one of which is passed through corrugating rolls and the other not. The corrugated sheet has to be fed to the corrugating rolls at a faster rate than the speed of movement of the plain sheet so that when the sheets are brought together and joined, they are moving together at the same velocity. Since the sheets are bonded together, the end product of this stage of production is fairly easy to handle and there is very little difficulty in laying up such duplex sheets to form the desired final body having voids or channels extending through it.

However, there are instances where it is not possible to join the sheets together. For example, in those cases where to do so would damage the sheet or coatings applied to the sheet. There are also instances where it is uneconomic to introduce a joining step in the production of the final article. In these instances it is difficult to lay up these duplex sheets to fabricate the desired final body.

According to one aspect of the present invention there is provided a method of manufacturing a body comprising the steps of forming a single strip of material with at least one plain region and at least one region of protrusions, and laying the single strip of material on itself in a manner so as to provide two or more layers of the material and locate a plain region of one layer alongside a region of protrusion of an adjacent layer.

According to a further aspect of the present invention there is provided a body having a single continuous strip of material provided with a plain region and a region of protrusions along the strip, a plain region of the strip being laid on to a region of protrusions to form layers comprising alternately a plain region and a region of protrusions.

Preferably the strip is provided with alternate plain regions and regions of protrusions extending along the length of the strip.

The step of laying a plain region of the strip on to a region having the protrusions may be carried out by folding the strip in a zig-zag manner about transverse axes spaced along the length of the strip at intersections between plain regions and regions of protrusions. In this case, the body may be in the form of a stack of contiguous generally planar alternate corrugated and plain sheets.

Alternatively, the laying step may be accomplished by winding the strip into a coil. Preferably, in this case, the length of each region of the strip, prior to winding the strip into a coil, is at least equal to the circumference, or length of lap onto which the respective region is wound. That is to say, that the body has successive windings comprising alternately one revolution of protrusions followed by one revolution of plain strip. It is possible, however, to construct each winding (i.e. one complete revolution) of the strip with a plurality of alternate plain regions and regions of protrusions located so that the respective regions of successive windings are positioned relative to the layer on which it is wound so that, progressing radially there are alternate layers of plain regions and regions of protrusions.

Each layer of the body may comprise one or more plain regions and one or more regions having protrusions and the juxtaposed planar layers may be arranged relative to one another so that a plain region of one layer lies adjacent a region of protrusions of the next adjacent layer.

The strip may be worked to provide it with only one plain region and one region of protrusions and the step of laying the plain region on to the region of protrusions comprises the steps of folding the strip about an axis extending across the strip adjacent the intersection between the plain region and the region of protrusions and winding the folded strip on to itself, starting at the intersection, to form a coil.

Preferably the protrusions are in the form of corrugations. The corrugations may be formed by passing the strip through the nip of two intermeshing corrugating rolls. Alternatively the protrusions may be in the form of ridges or bumps protruding out of the general plane of the strip, or they may be tabs which project from a surface of the strip.

In the case where the protrusions are in the form of corrugations it is preferable that the crests and valleys of the corrugations extend in a direction transverse to the length of the strip so that the body has corresponding transverse channels extending between the layers. Alternatively the crests and valleys of a corrugated region may extend in a direction along the length of the strip so that the body has voids extending in a direction along the strip between adjacent layers.

The whole strip, or parts of the strip may be perforated, for example, some or all of the regions having the protrusions may be foraminated or some or all of the plain regions may be foraminated.

The strip may be made of any desired material depending upon the intended use of the body. For example if the body is to be used as an electrical resistance heater for heating a fluid flowing through the voids between the contiguous sheets, the strip may be made from an electrically conductive material such as a metal; or a ceramic such as electrically conductive silicon nitride or a ferroelectric material having a perovskite type of crystal structure, for example lanthanum barium titanate.

If the body is to be used as a screen or filter then the strip may be made of a porous filter or screening material which can be worked to provide the protrusions and the plain regions for example metal, fibres, paper, plastics material or felts.

The body may form a catalyst support such as for example for use in catalysing combustion products of the exhaust gases of an internal combustion engine.

The material may be a metal such as for example an aluminium bearing ferritic steel of the type known as fecralloy, or may be a ceramic substrate such as for example alumina, or silicon nitride. Alternatively the strip may be fabricated from any other substrate which forms a support for a catalyst or the strip may be made from a material which is itself a catalyst.

The catalyst may be a noble metal and in particular, when used as a catalyst for catalysing the products of combustion of an internal combustion engine the catalyst may be platinum or palladium.

The catalyst may be applied to the strip before the strip is worked to provide it with the protrusions or after the strip has been so worked. Alternatively it may be possible to apply the catalyst to the completed body.

The following co-pending British Patent Applications Nos. 55466/72; 57208/73; 8303/74; 20988/74; 20990/74; 38900/74 and cognate applications 15579/73; 51979/73; 51980/73; describe various bodies comprising a catalyst support and a catalyst applied to the support, and various methods of depositing the catalyst on to the support.

Bodies according to the present invention may be used as the support for the catalyst described in any of the above mentioned patent applications. Similarly the methods of depositing the catalyst on the support, and the catalysts, as described in these patent applications may be used with bodies constructed according to the present invention.

The body may be used to effect pyrolysis if the strip is made from, or coated with, a material which will effect pyrolysis of a fluid flowing through the voids between adjacent contiguous sheets.

A number of bodies constructed in accordance with the method of the present invention will be described, by way of examples, with reference to the accompanying drawings, in which.

In the following examples the bodies are intended for use as a catalyst in an exhaust gas purification system for an internal combustion engine. The strip is made of an aluminium bearing ferritic steel, of the type known as FECRALLOY (a Trade Mark of the United Kingdom Atomic Energy Authority) to which is applied a catalyst such as for example platinum, or palladium metal. Such a supported catalyst is described in our co-pending cognate British Patent Applications Nos. 15579/73, 51979/73 and 51980/73. The method used to deposit the catalyst on the strip may be that described in our co-pending British Patent Applications Nos. 57208/73, 20990/74, 8303/74, 20988/74, and 38900/74. The strip is 0.002 ins (0.05 mm) thick, 4.0 ins (101.6 mm) wide, and of various lengths.

Figure 1:
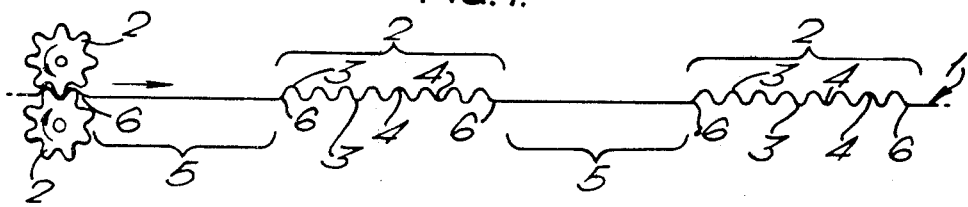
FIGS. 1 and 6 show cross-sectional views of parts of strips of metal worked in accordance with the present invention to provide a number of alternate corrugated and plain regions.

Referring to FIG. 1 a length of plain strip 1, that is to say an uncorrugated strip, is passed through the nip of two corrugating rolls 12 to form a region 2 having protrusions in the form of corrugations. The region 2 extends a predetermined distance along the longitudinal axis of the strip. In the examples shown, the crests 3 and valleys 4 of the corrugations extend in a direction transverse to the longitudinal axis of the strip. The corrugating rolls 12 are then moved away from the strip 1 and the strip 1 is advanced past the rolls to leave a plain uncorrugated region 5. The rolls 12 are then moved back into engagement with the strip 1 to form a further corrugated region which extends along the strip 1. In this way, the strip 1 is provided with alternate corrugated regions 2 and plain regions 5.

By controlling the speed of movement of the strip 1 through the rolls 12 and the time interval that the rolls 12 are in, or out of contact with the strip 1, it is possible to adjust the lengths of the respective corrugated or plain regions 2 or 5.

To fabricate a body which has alternate corrugated and plain contiguous layers using the strip shown in FIG. 1, the plain regions 2 are laid on to the corrugated regions 5. There are many ways of doing this.

Figure 2:
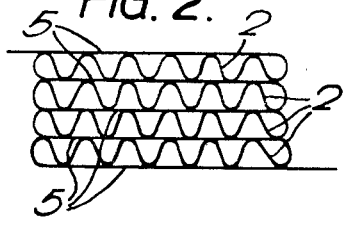
FIGS. 2 to 5 show bodies constructed by layering the strip of FIG. 1 in accordance with the present invention.

Referring to FIG. 2 the strip 1 may be folded alternately one way and then the other in a zig-zag manner about axes 6 which extend in a direction normal to the length of strip 1 at the intersection between plain regions 5 and corrugated regions 2. The length of each corrugated or plain region 2 or 5 is arranged to allow for each plain region to be stacked on a corrugated region to provide effectively contiguous alternate juxtaposed corrugated and plain sheets.

Figure 3:
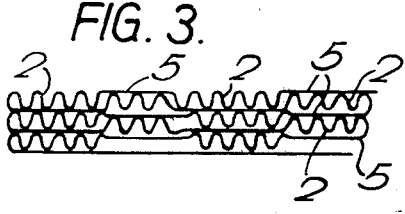

If desired each layer so formed may have alternate corrugated and plain regions 2, 5 as illustrated in FIG. 3.

Figure 4:
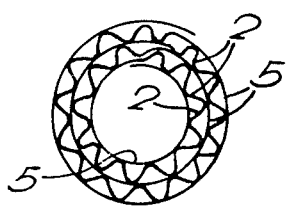

Referring to FIG. 4, the strip 1 of FIG. 1 is wound into a coil. The length of each region 2, 5 measured in a direction along the strip 1, is at least equal to the circumference on to which the respective region 2 or 5 is to be wound. In this way the final body comprises alternate layers of corrugated and plain sheets each extending for one revolution.

Figure 5:
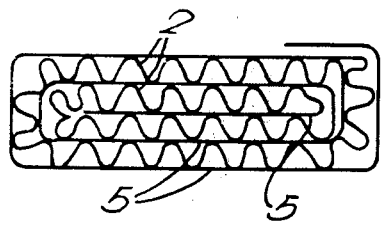

A further variation of coiling the strip 1 of FIG. 1 is shown in FIG. 5. The coiled strip of FIG. 5 does not have a large unfilled centre section as with the coil of FIG. 4. Instead, a first flat plain region 5 has wound on it one revolution of a corrugated region 2 followed by one revolution of a second plain region 5 and so on.

Figure 6:
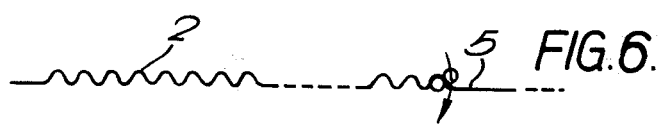
Figure 7:
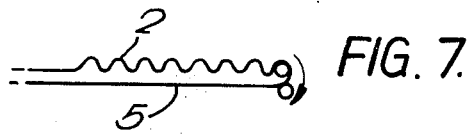
FIGS. 7 and 8 show successive steps in the fabrication of a body in accordance with the present invention using the strip shown in FIG. 6.
Figure 8:
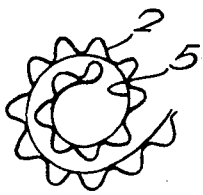

Referring to FIG. 6 there is shown a strip 1 formed in the same way as strip 1 of FIG. 1 except that for each body to be made from the strip, the strip is provided with only one plain region 5 and one corrugated region 2.

To fabricate a body from the strip, a two-pronged folding tool is slid into position at the intersection between the plain and corrugated regions 2 and 5. One prong of the tool lies across the strip 1 normal to the longitudinal axis of the strip 1 on one side of the strip whilst the other prong lies across the strip 1 on the other side. By rotating the two-pronged tool about an axis extending normal to the longitudinal axis of the strip 1, the plain region 5 may be made to lie along-side the corrugated region 2. Further rotation of the tool will wind the strip 1 into a coil, which, progressing radially outward, comprises effectively alternate layers of corrugated and plain sheets.

The cross-sectional shape of the corrugations may be of any desired form for example it may be a succession of alternate inverted and non inverted "V" or "U" shapes, or rectangular channels or may be of sinusoidal form.

The strip may be coated with a powder prior to applying the catalyst to extend the surface area of the strip. Alternatively the surface of the strip may be roughened prior to applying the catalyst to achieve the same aim.

The protruding regions referred to hereinbefore may be formed by pressing up ridges or bumps or by dimpling the sheets instead of by corrugating the sheets.

We claim:

1. A method of manufacturing a body, which method comprises the steps of forming a single elongate strip of material with regions comprising; alternately along the length of the strip, a plain region and a region of protrusions; laying the, or each, plan region onto the, or each, region of protrusions by folding the strip about an axis extending across the strip transverse to the length of the strip; and winding the folded strip onto itself, starting at the axis about which the strip is folded to form a coil which comprises alternate layers of plain and corrugated strip.

2. A method according to claim 1, wherein each layer of the coiled strip is arranged to have a plurality of alternate plain regions and regions of protrusions located so that the respective regions of successive layers are positioned relative to adjacent layers so that, progressing radially, there are alternate layers of plain regions and regions of protrusions throughout the body.

3. A method according to claim 1, wherein the the strip is folded about an axis extending across the width of the strip at an intersection between a plain region and a region of protrusions.

4. A method according to claim 1, wherein the strip is worked to provide it with one plain region and one region of protrusions, and the strip is folded about an axis extending across the strip adjacent the intersection between the plain region and the region of protrusions.

5. A method according to claim 1, wherein the protrusions are in the form of corrugations.

6. A method according to claim 5, wherein the crests and valleys of the or each region of corrugations extend in a direction transverse to the length of the strip so that the body has corresponding transverse channels extending between the layers.

7. A method according to claim 5, wherein the crests and valleys of the each region of corrugations extend in a direction along the length of the strip so that the final product has voids extending in a direction along the length of the strip between adjacent layers.

8. A method according to claim 1, wherein the protrusions are in the form of ridges.

9. A method according to claim 1, wherein the protrusions are raised bumps.

10. A method according to claim 1, wherein the protrusions are tabs projecting from a surface of the strip.

11. A method according to claim 1, wherein the strip is perforated.

12. A method according to claim 1, including the step of depositing a catalyst on the strip of material.

13. A method according to claim 12, wherein the catalyst is applied to the strip prior to working the strip to provide the regions of protrusions.

14. A method according to claim 12, wherein the catalyst is applied to the strip after working the strip to provide the regions of protrusions.

15. A method according to claim 1, wherein the strip is made of metal.

16. A method according to claim 15, wherein the metal is an oxidised aluminium bearing ferritic steel.

17. A method according to claim 1, wherein the strip is a ceramic.

18. A body comprising a single continuous elongate strip of material which has been worked to provide it with regions comprising, alternately along the length of the strip, a plain region and a region of protrusions, and has been folded about an axis extending across the strip transverse to the length of the strip to lay a plain region of the strip onto a region of protrusions wherein the folded strip has been wound onto itself to form a coil.

19. A body according to claim 18, wherein the strip is made of a ceramic.

20. A body according to claim 18, wherein the strip is made of a metal.

21. A body according to claim 20, wherein the metal is an aluminium bearing ferritic steel.

22. A body according to claim 21, wherein the steel is oxidised so as to form an oxide layer on a surface thereof.

23. A body according to claim 18, wherein a catalyst is applied to at least part of the strip.

24. A body according to claim 18, wherein the axis is located adjacent an intersection between a plain region and a region of protrusions.

25. A body according to claim 18, wherein the protrusions are in the form of corrugations.

26. A body according to claim 18, wherein the protrusions are in the form of bumps.

27. A body according to claim 18, wherein the protrusions are in the form of ridges.

28. A body according to claim 18, wherein each winding of the coil comprises successive plain regions and regions having protrusions, and juxtaposed windings of the coil are arranged relative to one another so that a plain region of one winding lies adjacent a region of protrusions of the next adjacent winding.

* * * * *